US008707225B1

(12) United States Patent
Das (10) Patent No.: US 8,707,225 B1
(45) Date of Patent: Apr. 22, 2014

(54) SYNTHESIS OF AREA-EFFICIENT SUBTRACTOR AND DIVIDER FUNCTIONAL BLOCKS

(75) Inventor: Sabyasachi Das, Santa Clara, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 1571 days.

(21) Appl. No.: 11/399,984

(22) Filed: Apr. 7, 2006

(51) Int. Cl.
*G06F 17/50* (2006.01)

(52) U.S. Cl.
USPC ............ 716/102; 716/101; 716/132; 716/135

(58) Field of Classification Search
USPC .............................................. 716/18; 326/53
See application file for complete search history.

(56) References Cited

U.S. PATENT DOCUMENTS

| | | | | |
|---|---|---|---|---|
| 5,251,164 | A | * | 10/1993 | Dodson et al. ................ 708/201 |
| 5,270,955 | A | * | 12/1993 | Bosshart et al. .............. 708/525 |
| 5,508,950 | A | * | 4/1996 | Bosshart et al. .............. 708/525 |
| 5,883,825 | A | | 3/1999 | Kolagotla |
| 5,956,257 | A | * | 9/1999 | Ginetti et al. ...................... 716/3 |
| 6,018,758 | A | | 1/2000 | Griesbach et al. |
| 6,295,628 | B1 | * | 9/2001 | Nakamura ......................... 716/2 |
| 6,769,007 | B2 | | 7/2004 | Sutherland et al. |
| 6,781,412 | B2 | * | 8/2004 | Yoshida et al. .................. 326/53 |
| 2006/0059222 | A1 | * | 3/2006 | Dewan ........................... 708/700 |
| 2006/0161614 | A1 | * | 7/2006 | Vashishta et al. .............. 708/670 |

OTHER PUBLICATIONS

EPO Publication 0347029.*

J. Pihl, E.J. Aas, "A Multiplier and Squarer Generator for High Performance DSP Applications" in Proceeding of IEEE 39th Midwest Symposium on Circuits and Systems, pp. 109-112, 1997.
J.T. Yoo, K.F. Smith, G. Gopalakrishnan, "A Fast Parallel Squarer Based on Divide-and-Conquer" in IEEE Journal on Solid State Circuits, vol. 32, No. 1, pp. 909-912, Jun. 1997.
R.K Kolagotla, W.R. Griesbach, H.R. Srinivas, "VLSI Implementation of 350MHz 0.35µm, 8 Bit Merged Squarer", in IEEE Electronics Letters, vol. 34, No. 1, pp. 47-48, Jan. 1998.
A.G.M. Strollo, E. Napoli, D. De Caro, "A New Design of Squarer Circuits Using Booth Encoding and Folding Techniques" in Proceedings of 8th IEEE International Conference on Electronics, Circuits and Systems, Malta, pp. 193-196, Sep. 2-5, 2001.
A.G.M. Strollo, D. De Caro, "Booth Folding Encoding for High Performance Squarer Circuits" in IEEE Transaction on Circuits and Systems II: Analog and Digital Signal Processing, vol. 50, No. 5, pp. 250-254, May 2003.

(Continued)

*Primary Examiner* — Paul Dinh
*Assistant Examiner* — Bryce Aisaka
(74) *Attorney, Agent, or Firm* — Alford Law Group, Inc.; Tobi C. Clinton (57) ABSTRACT

In one embodiment of the invention, a method of designing an integrated circuit including a subtraction arithmetic function is provided. The method includes generating a netlist of an area-efficient subtractor to subtract a first input vector from a second input vector. A netlist of a plurality of reduced full subtractor cells is generated with each including an exclusive-NOR gate evaluating a shared Boolean expression to generate a sum bit output and a carry bit output. The netlist of the reduced full subtractor cell is replicated for all bits of the area-efficient subtractor but for the least significant bit. One of a plurality of netlists of subtractor cells is selected for the least significant bit of the area-efficient subtractor in response to a flex bit.

27 Claims, 6 Drawing Sheets

(56) References Cited

OTHER PUBLICATIONS

Y. Jeang, L.B. Chen, J.H. Tu, I.J. Huang "An Efficient and Low Power Systolic Squarer" in Proceedings of IEEE International Symposium on VLSI Design Automation and Test, pp. 37-40, Apr. 27-29, 2005.
C.S. Wallace, "A Suggestion for a Fast Multiplier" in IEEE Transaction on Electronic Computers, pp. 14-17, 1964.
L. Dadda, "Some Scheme's for Parallel Multiplies" in Alta Frequenza, vol. 34, pp. 349-356, 1965.
K.C. Bickerstaff, E.E. Swartzlander, M.J. Schulte, "Analysis of Column Compression Multipliers", in Proceedings of 15th IEEE Symposium on Computer Arithmetic, pp. 33-39, 2001.
R.P. Brent, H.T. Kung, "A Regular Layout for Parallel Adders", in IEEE Transaction on Computers, pp. 260-264, 1982.
P.M. Kogge, H.S. Stone, "A Parallel Algorithm for Efficient Solution of a General Class of Recurrence Equations" in IEEE Transaction on Computers, No. 8, 786-793, Aug. 1973.
P.F. Stelling, V.G. Oklobdzija, "Design Strategies for the Final Adder in a Parallel Multiplier" in Journal of VLSI Processing, pp. 591-595, 1996.
Gunok Jung and Gerald E. Sobelman, High-Speed Adder Design Using Time Borrowing and Early Carry Propagation, 2000 IEEE, pp. 43-47.
Mohammad S. Alam, Optical Carry-free Addition and Borrow-free Subtraction Using Signed-Digit Numbers, 1994 IEEE, pp. 1040-1045.
Abdallah K. Cherri, Optical Carry-free Additon and Borrow-free Subtraction Based on Redundant Signed-Digit Numbers, pp. 1094-1099.
David M. Lewis, Member, IEEE, An Architecture for Addition and Subtraction of Long Word Length Numbes in the Logarithmic Number System, 1990 IEEE, pp. 1325-1336.
Herbert Taub Donald Schilling, Professors of EE, The City College of the City Univ. of New York, Digital Integrated Electronics, 1977 McGraw-Hill, Inc., pp. 356-391.
M. Morris Mano, Professor of Eng, CA State University, LA, Digital Logic and Computer Design, 1979 Prentice-Hall, Inc., Chapter 4, pp. 116-125.
John P. Hayes, Univesity of Southern California, Computer Architecture and Organization, 1978 McGraw-Hill, Inc., Section 3.3, pp. 171-209.
A. J. Al-Kahlili, A. Hu, "Design of a 32-bit Squarer—Exploiting Addition Redundancy", Proceedings of the 2003 International Symposium on Circuits and Systems, vol. 5, pp. v-325-V-328. 2003.
V. G. Oklobdzija et al.. "A Method for Speed Optimized Partial Product Reduction and Generation of Fast Parallel Multipliers Using an Algorithmic Approach". IEEE Transactions on Computers, vol. 45, issue 3, pp. 294-306, Mar. 1996.

* cited by examiner

SYNTHESIS OF AREA-EFFICIENT SUBTRACTOR AND DIVIDER FUNCTIONAL BLOCKS

FIELD

The embodiments of the invention relate generally to electronic design automation (EDA) for integrated circuits. More particularly, the embodiments of the invention relate to timing driven synthesis of subtractor functional blocks within integrated circuits.

BACKGROUND

Processing technology for semiconductor integrated circuits has been steadily shrinking such that the area that a transistor occupies is very small. In a typical integrated circuit design, one of the most important design criteria is speed. The number of gates and transistors is of less importance than minimizing the delay through a functional block. That is, speed or delay minimization is now more important than area considerations in an integrated circuit. Functional blocks in semiconductor integrated circuits are often designed to minimize the timing delay of the resultant output. As a result, area-saving designs are now often overlooked.

In some cases, a particular data path block may not fall into the critical timing path. That is, slower logic designs may be used for a functional block and the overall timing requirements for the data path can still be met.

It is desirable to consider the signal timing along data paths during the logical synthesis of functional blocks in integrated circuits.

BRIEF SUMMARY

The embodiments of the invention are summarized by the claims that follow below.

DETAILED DESCRIPTION

In the following detailed description of the embodiments of the invention, numerous specific details are set forth in order to provide a thorough understanding of the embodiments of the invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

The embodiments of the invention include a method, apparatus and system for the synthesis of the circuit logic of functional blocks that generally include a subtractor. An area efficient subtractor is selected over conventional designs if a data path is not in the timing critical path, such that the extra delay through the area efficient subtractor is not an issue.

A literal is a primed binary vector/variable (e.g., y') or unprimed binary vector/variable (e.g., y) in the Boolean expression. The unprimed binary vector/variable is the normal form of a signal. The primed binary vector/variable is the complement or inverted form of the signal often generated by using a set of inverters or NOT gates.

In the modern VLSI chips, faster and larger data-path components are used in timing-critical data-paths. However, smaller and slower data-path components may be used in non-timing-critical data-paths or in area-critical data-paths.

Arithmetic operations are often performed in the data-paths on vectors having multiple bits or multiple samples. For example a vector B with binary bits $b_{N-1} b_{N-2} \ldots b_2 b_1 b_0$ may be subtracted from a vector A with binary bits $a_{N-1} a_{N-2} \ldots a_2 a_1 a_0$. A conventional subtraction function would be implemented by first converting vector B into two's complement form by inverting bits $b_{N-1} b_{N-2} \ldots b_2 b_1 b_0$. Then a bit wise add would be performed with the complemented bits of vector B being added to the respective bits $a_{N-1} a_{N-2} \ldots a_2 a_1 a_0$ of vector A (along with input Carry$_0$ set to logic one) using a fast adder. However, a fast adder uses quite a few gates and transistors, more than the area efficient subtractor disclosed herein. If a slower subtractor can be used with fewer gates and transistors, area savings can result. Moreover, with fewer gates and transistors, power can be conserved by the embodiments of the invention.

The embodiments of the invention provide method, apparatus, and code to synthesize an area-efficient subtractor implementing a vector function of Z=A–B in non-critical data-paths of an integrated circuit design. Divider functional blocks are often implemented using a subtractor, such that the area-efficient subtractor can reduce the area of a divider implemented on a semiconductor die.

The embodiments of the area-efficient subtractor of the invention perform subtraction without externally inverting all bits of the vector B input. Boolean logic expressions for Sum$_i$ and Carry$_{i+1}$ for an area efficient one-bit subtractor are provided (without using the adder expressions) that can be replicated for other bits of a multi-bit subtractor functional block. The Boolean logic expressions for the Sum$_i$ and Carry$_{i+1}$ expressions are optimized to enable the sharing of an exclusive-nor gate in almost every bit, but for the least significant bit (LSB). The embodiments of the invention may provide a smaller area footprint for both subtractor and divider functional blocks.

Figure 1:
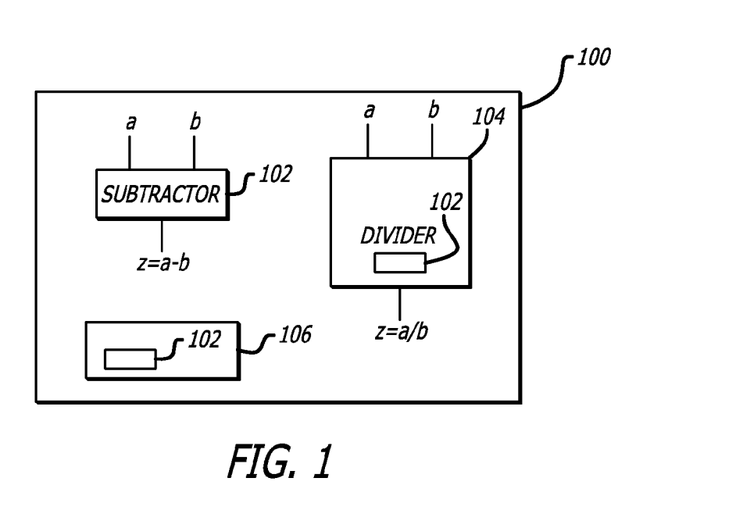
FIG. 1 is a diagram illustrating an exemplary integrated circuit with one or more functional blocks having circuit logic synthesized in accordance with the embodiments of the invention.

Referring now to FIG. 1, an integrated circuit 100 includes one or more area-efficient subtractor functional blocks 102 and/or one or more divider functional blocks 104. The divider functional blocks 104 are implemented by using at least one subtractor functional block 102 to perform subtraction over and over again until the division is completed. Each of these functional blocks may have its logical circuitry synthesized or generated by an ECAD tool in one embodiment of the invention. Each of these functional blocks may be present in data paths of an integrated circuit.

Functional block 102 is a subtractor to subtract vector b from vector a to obtain the result z=a−b. In this equation, z is the difference, a is the minuend, and b is the subtrahend. Functional block 104 is a divider to divide the vector a by b to obtain the result z=a/b. In this equation, z is the quotient, a the dividend, and b the divisor. Functional block 106 is any functional block that may include a subtraction logical operation, including a subtractor 102, to evaluate any difference expression of the general form of a−b. In more modern VLSI chips with larger data path widths, the design of functional blocks with a subtraction operation in a data path can be challenging to conserve area.

The subtraction problem can be formulated into the vector equation Z=A−B−C where A and B are both n-bit wide vectors. With n-bit wide vectors ($a_0$ through $a_{n-1}$ and $b_0$ through $b_{n-1}$), the final output Z has a width of (n+1) bits ($sum_0$ through $sum_n$. C, referred to as a flex bit herein, is a single bit to subtract from the quantity (A−B). The flex bit C can be set to a constant value of one or zero or it can be a variable signal that changes between logic one and zero. If C is equal to logic 0, the vector equation reduces to Z=A−B. If C is equal to logic 1, the vector equation becomes Z=A−B−1.

To reduce the area of a binary subtractor functional block, a ripple carry architecture is used. The sum (subtraction or difference) bit and carry (or borrow) out bit for the $i^{th}$ bit cell is computed with the carry out bit coupled into the $(i+i)^{th}$ bit cell. The sum (subtraction or difference) bit and carry (or borrow) out bit for the $(i+1)^{th}$ bit cell is then computed with the carry out bit being coupled into the $(i+2)^{th}$ bit cell, and so on and so forth through n bits associated with the bits of the vectors A and B.

The synthesis of an n-bit subtractor can be analyzed bit by bit to determine the one or more bit cells needed for subtraction of the respective bits of each vector. If one single bit cell may be used for each $i^{th}$ bit, it may be replicated multiple times.

Figure 2:
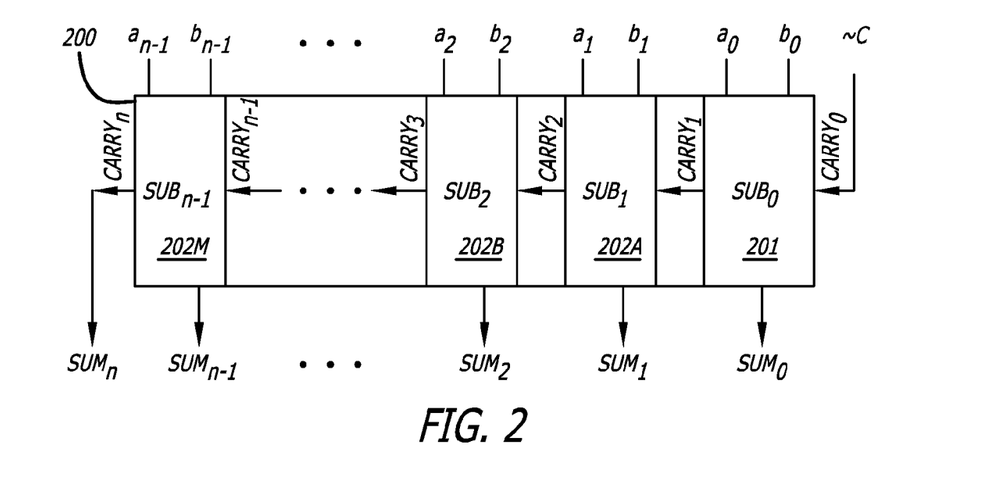
FIG. 2 is a functional block diagram illustrating bit cells of an area efficient subtractor functional block.

Referring now to FIG. 2, an area efficient subtractor 200 is illustrated. The area efficient subtractor 200 includes a bit 0 subtractor cell $SUB_0$ 201 and bit 1 subtractor cell $SUB_1$ 202A through bit n−1 subtractor cell $SUB_{n-1}$ 202M. The bit 0 subtractor cell $SUB_0$ 201 receives bit $a_0$ of vector A into a first input and bit $b_0$ of vector B into a second input. The bit 0 subtractor cell $SUB_0$ 201 may also receive a complement of a flex bit C coupled into a carry input $Carry_0$ (the complement of the flex bit indicated by ~C in FIG. 2). Alternatively, a constant logical zero or logical one may be coupled into the carry input $Carry_0$ of the subtractor cell $SUB_0$ 201. The bit 0 subtractor cell $SUB_0$ 201 generates a sum or difference bit $sum_0$ and a carry or borrow output bit $Carry_1$.

The bit 1 subtractor cell $SUB_1$ 202A receives bit $a_1$ of vector A, bit $b_1$ of vector B, and $carry_1$ from bit 0 subtractor cell $SUB_0$ 201. Bit 1 subtractor cell 202A generates a sum or difference bit $sum_1$ and a carry or borrow output bit $Carry_2$.

Bits $a_2$ through $a_{n-1}$ of the vector A and bits $b_2$ through $b_{n-1}$ of vector B are coupled into subtraction cells $SUB_2$ 202B through $SUB_{n-1}$ 202M. Each subtraction cell receives the respective carry or borrow bit from the prior subtraction bit cell. The subtraction bit cells $SUB_2$ 202B through $SUB_{n-1}$ 202M generate the respective difference or sum outputs $Sum_2$ through $Sum_{n-1}$. Each subtraction bit cells $SUB_2$ 202B through $SUB_{n-1}$ 202M generates the respective carry or borrow output bit for the next cell or in the case of the subtraction bit cell for the most significant bit, the final carry out or the $Sum_n$ output.

Note that the least-significant bit, bit 0, of the subtractor 200 may be special in that the flex bit C and its complement ~C coupled to the carry input may be variable. Alternatively, the carry input, and the flex bit C, although complements of each other, may be set to a constant logical one or logical zero.

Consider the $i^{th}$ bit of the subtractor, it has 3 inputs: $A_i$, $B_i$ and the $Carry_i$. None of these three signals are inverted. By performing a truth-table analysis, we can determine the functionality of the $i^{th}$ bit in the subtractor as follows (the symbols "~" means to logically complement or invert the literal that follows, "∩" means to logically AND literals together, and "U" means to logically OR literals together):

$$Sum_i=(\sim A_i \cap \sim B_i \cap \sim Carry_i) U (\sim A_i \cap B_i \cap Carry_i) U$$

$$(A_i \cap \sim B_i \cap Carry_i) U (A_i \cap B_i \cap \sim Carry_i)$$

$$Carry_{i+1}=(A_i \cap \sim B_i) U (A_i \cap B_i \cap Carry_i) U (\sim A_i \cap \sim B_i \cap Carry_i)$$

Analysis of several technology libraries, we find that an exclusive-nor (XNOR) gate conserves area better than an exclusive-or (XOR) gate. Thus, it is preferable to modify the $Sum_i$ and $Carry_{i+1}$ expressions to use XNOR gates. Additionally, it is preferable to formulate these expressions in such a way, so that there is substantial common sub-expressions present between $Sum_i$ and $Carry_{i+1}$ expressions so that logical gates may be shared.

Taking these design goals into account, final expressions for $Sum_i$ and $Carry_{i+1}$ in the $i^{th}$ bit of the subtractor are:

$$Sum_i=(A_i\, _{XNOR}\, B_i)_{XOR} Carry_i$$

$$Carry_{i+1}=((A_i\, _{XNOR}\, B_i) \cap Carry_i) U (A_i \cap \sim B_i)$$

Note the overlapping sub-expression of ($A_i\, _{XNOR}\, B_i$). This allows one XNOR gate to be used for both $Sum_i$ and $Carry_{i+1}$; This results in significant area savings, irrespective of the bit widths of a subtractor. Thus, these equations are synthesized into logic gates by the synthesizer software.

Figure 3:
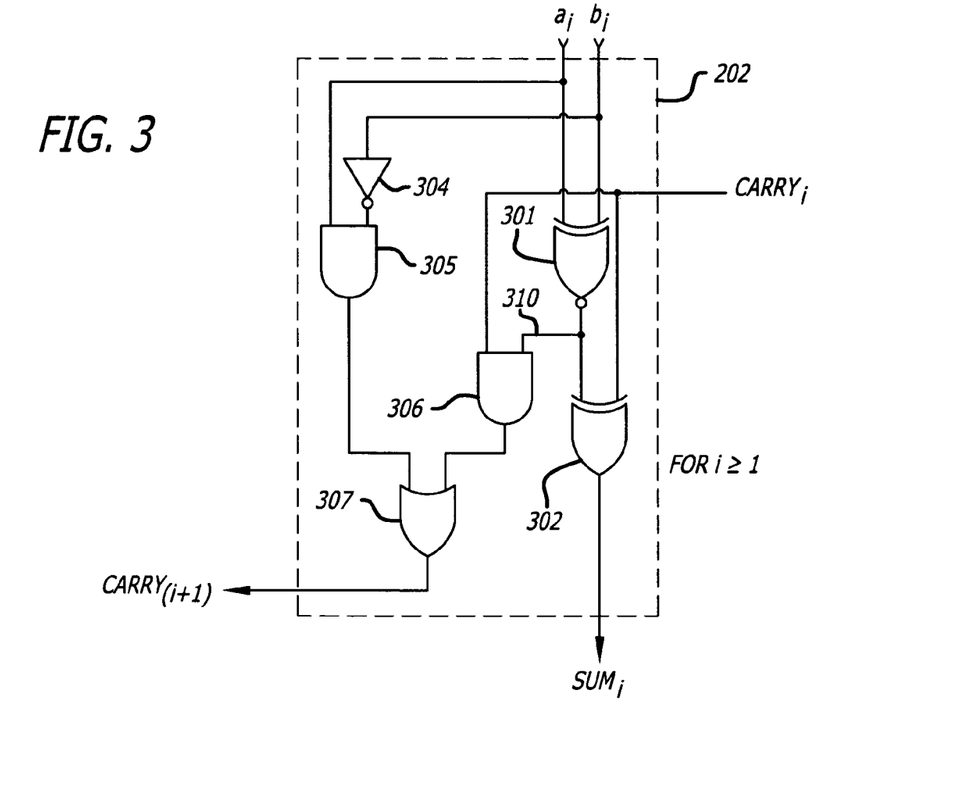
FIG. 3 is a logic diagram illustrating a combinational logic schematic of an area-efficient full subtractor cell for bit numbers greater than or equal to one.

Referring now to FIG. 3, a reduced full subtractor cell 202 is illustrated that is replicated as the subtraction bit cells 202A through 202M for $i^{th}$ of the area efficient subtractor 200 where i is greater than or equal to one. The reduced full subtractor cell 202 includes an exclusive-NOR gate 301 (XNOR), an exclusive-OR gate (XOR) 302, inverter 304, AND gates 305-306, and OR gate 307 coupled together as shown.

The XNOR gate 301 receives bit $a_i$ of vector A and bit $b_i$ of vector B to generate the common sub-expression ($A_i\, _{XNOR}\, B_i$) at node 310 that is shared in the Boolean expressions for $Sum_i$ and $Carry_{i+1}$. The common sub-expression ($A_i\, _{XNOR}\, B_i$) at node 310 is coupled into a first input of each of the XOR gate 302 and the AND gate 306 to reduce the number of gates within the full subtractor cell. The XOR gate 302 and the AND gate 306 further receive the carry input bit $carry_i$ as a second input.

The XNOR gate 301 and XOR gate 302 generate the difference for the given bit cell from the input bits $a_i$ and $b_i$ and any borrow indicated on the carry input bit, $carry_i$. The XOR gate 302 logically exclusive-ORs together the common sub-expression ($A_i\, _{XNOR}\, B_i$) and the carry input bit $carry_i$ together at its output $sum_i$. That is, the difference is generated on the output $sum_i$ from the XOR gate 302.

With the common sub-expression ($A_{i\ XNOR}\ B_i$) at node 310 from the XNOR gate 301; the inverter 304, AND gates 305-306, and OR gate 307 function together to generate the carry output bit carry$_{(i+1)}$ to indicate a borrow to the next higher order bit during subtraction.

As discussed previously, AND gate 306 receives as its inputs the common sub-expression ($A_{i\ XNOR}\ B_i$) at node 310 as a first input and the carry input bit carry$_i$ as a second input. The AND gate 306 logically ANDs together the common sub-expression ($A_{i\ XNOR}\ B_i$) and the carry input bit carry$_i$ at its output. The output of AND gate 306 is coupled to a first input of the OR gate 307.

Inverter 304 receives bit b$_i$ of vector B and logically inverts it to ~b$_i$ at its output that is coupled into a first input of the AND gate 305. AND gate 305 receives bit a$_i$ of vector at its second input. The AND gate 305 logically ANDs bit a$_i$ and the inverted bit ~b$_i$ together at its output that is coupled into a second input of the OR gate 307.

The OR gate 307 logically ORs together the outputs from AND gates 305 and 306 to generate the carry output carry$_{(i+1)}$ at its output. The output of the OR gate 307 is coupled into the next reduced full subtractor cell as the carry input or, if the most significant bit (MSB) of the subtractor, the final carry out bit or the sum$_n$ output bit.

After synthesizing the reduced full subtractor cell 202 for the i$_{th}$ bit, it may be replicated by the synthesizer multiple times from bit one to bit n−1 to instantiate the subtractor bit cells 202A through 202M.

As discussed previously, the least significant bit, bit 0, is a special case in the area efficient subtractor 200 due to the flex bit C. In certain cases, the reduced full subtractor cell may be further simplified to a reduced half subtractor cell for the least significant bit.

Figure 4A:
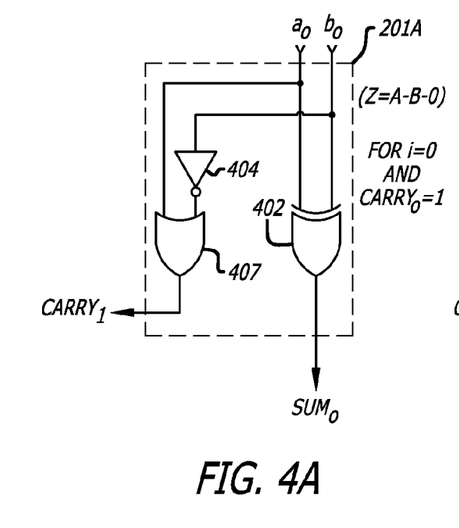
FIG. 4A is a logic diagram illustrating a combinational logic schematic of an area-efficient full subtractor cell for bit number zero if Carry$_0$ is logic one.
Figure 4B:
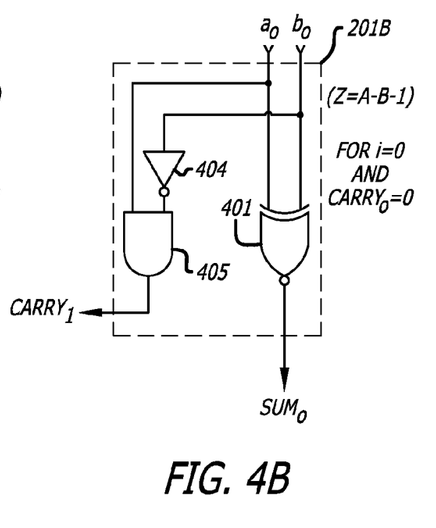
FIG. 4B is a logic diagram illustrating a combinational logic schematic of an area-efficient full subtractor cell for bit number zero if Carry$_0$ is logic zero.
Figure 4C:
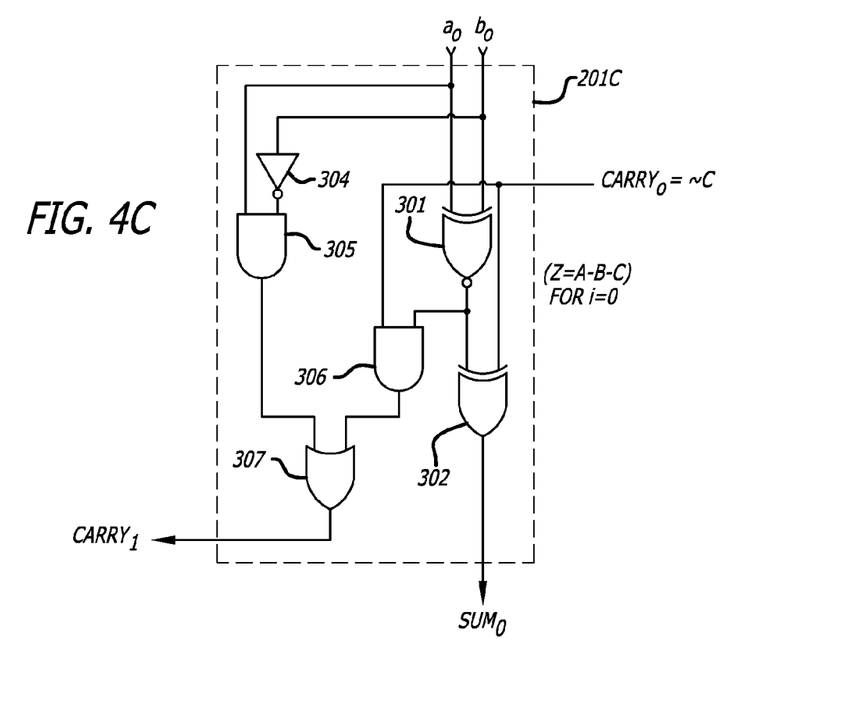
FIG. 4C is a logic diagram illustrating a combinational logic schematic of an area-efficient full subtractor cell for bit number zero if Carry$_0$ is variable.

FIGS. 4A-4C illustrate three possible subtractor bit cells 201A-201C that may be chosen as the subtractor cell 0 (SUB$_0$) 201 of the area efficient subtractor 200 in response to the flex bit C. Previously the full subtractor cell 202 was utilized for bits i greater than or equal to one. One of the subtractor bit cells 201A-201C are to be used as subtractor cell 0 (SUB$_0$) 201 for bit 0 of the area-efficient subtractor 200. As the subtractor bit cells 201A-201B do not include a carry input, they may be referred to as being two different versions of half subtractor cells.

If the vector subtraction to be performed is Z=A−B or Z=A−B−0, then the flex bit C may be considered to be unused or is set to a constant setting of logical zero. With the Carry$_0$ bit being the complement of the flex bit C, the Carry$_0$ is set to logical one in the reduced full subtractor 202. With the Carry$_0$ set to logical one in the reduced full subtractor 202, it can be further reduced to a first reduced half subtractor 201A. In which case, simplified Boolean expressions of Sum$_0$ and Carry$_1$ for the first reduced half subtractor are:

$$Sum_0 = A_{0\ XOR}\ B_0$$

$$Carry_1 = (A_0 U \sim B_0)$$

Now with reference to FIG. 4A, the first reduced half subtractor 201A includes an Exclusive-OR (XOR) gate 402, an inverter 404, and an OR gate 407 coupled together as shown. The XOR gate 402 receives bit a$_0$ of vector A and input bit b$_0$ of vector B to generate the sum or difference output bit for bit 0, sum$_0$. The inverter 404 receives bit b$_0$ of vector B and complements or inverts in on its output, that is coupled into an input of the OR gate 407. The OR gate 407 logically ORs together bit a$_0$ of vector A with the inverted bit b$_0$ to generate the carry output Carry$_1$ that is to be coupled into the next subtractor bit cell, subtractor bit cell Sub$_1$ 202A illustrated in FIG. 2.

Instead, if the vector subtraction to be performed is Z=A−B−1, then the flex bit C may be considered to be set to a constant setting of logical one. With the Carry$_0$ bit being the complement of the flex bit C, the Carry$_0$ is set to logical zero in the reduced full subtractor 202. With the Carry$_0$ set to logical zero in the reduced full subtractor 202, it can be further reduced to an alternate reduced half subtractor cell, a second reduced half subtractor 201B. In which case, simplified Boolean expressions of Sum$_0$ and Carry$_1$ for the alternative reduced half subtractor are:

$$Sum_0 = (A_{0\ XNOR}\ B_0)$$

$$Carry_1 = (A_0 \cap \sim B_0)$$

Referring now to FIG. 4B, the reduced half subtractor bit cell 201B is used in the case that the equation Z=A−B−1 is to be logically performed. In which case the carry input bit 0, carry$_0$ is set to logical 0 and the reduced full subtractor cell 202 further reduces to the reduced half subtractor 201B shown in FIG. 4B. The half subtractor bit cell 201B includes an XNOR gate 401, the inverter 404, and an AND gate 405 coupled together as shown.

The XNOR gate 401 receives at its inputs bit a$_0$ of vector A and b$_0$ of vector B. In this case, the XNOR gate 401 generates the sum bit 0 output, sum$_0$, by logically exclusive-NORing bit a$_0$ and bit b$_0$ together.

Inverter 404 receives bit b$_0$ of vector b and inverts it to its complement form, ~b$_0$). The complemented bit ~b$_0$ is coupled into a first input of the AND gate 405. AND gate 405 receives bit a$_0$ at a second input. The AND gate 405 logically ANDs bit a$_0$ and the complemented bit ~b$_0$ together to generate the carry output bit, carry$_1$, that is coupled into the next subtractor bit cell, Sub$_1$ 202A, as is illustrated in FIG. 2.

Instead, if the vector subtraction to be performed is Z=A−B−C, then the flex bit C is a variable signal whose value is not constant. In this case, no further simplification of the reduced full subtractor 202 may be found. Thus, the Boolean expressions of Sum$_0$ and Carry$_1$ for bit 0 of the subtractor are:

$$Sum_0 = (A_{0\ XNOR}\ B_0)_{XOR}\ Carry_0$$

$$Carry_1 = ((A_{0\ XNOR}\ B_0) \cap Carry_0) U (A_0 \cap \sim B_0)$$

In this case with the flex bit C being a variable, the Boolean expressions of Sum$_0$ and Carry$_1$ for bit 0 are derived from the equations for the ith bit described previously with i being set to zero.

FIG. 4C illustrates a reduced full subtractor cell 201C for bit zero, Sub$_0$ 201, of the subtractor 200 in the case that the C flex bit is being utilized in the equation Z=A−B−C. As described previously, the Carry$_0$ bit is the complement of the flex bit C. In this case, the carry input carry$_0$ is directly coupled to the complement of the flex bit C (the complement of the flex bit indicated by ~C in FIG. 4C). The logic gates 301-302, 304-307 of the subtractor cell 201C are the same logically as the subtractor cell 202 described previously and are not further described here for reasons of brevity.

Thus, the synthesis of the bit cell Sub$_0$ 201 of the area efficient subtractor 200 depends upon whether or not a flex bit C is being used as a variable, or is set to a constant logical one or logical zero. With the logic synthesis of the bit cell Sub$_0$ 201 determined and the logic synthesis of the full subtractor 202 known to be replicated for the remaining i bits, where i is greater than or equal to 1, the netlist representation for all of the (n+1) bits of the area efficient subtractor 200 can be generated.

While the previous discussion does not specifically discuss the format of a vector (e.g., signed, unsigned), the methods, apparatus, and code for the synthesis of an area-efficient subtractor described herein are equally applicable to signed and unsigned arithmetic.

Figure 5:
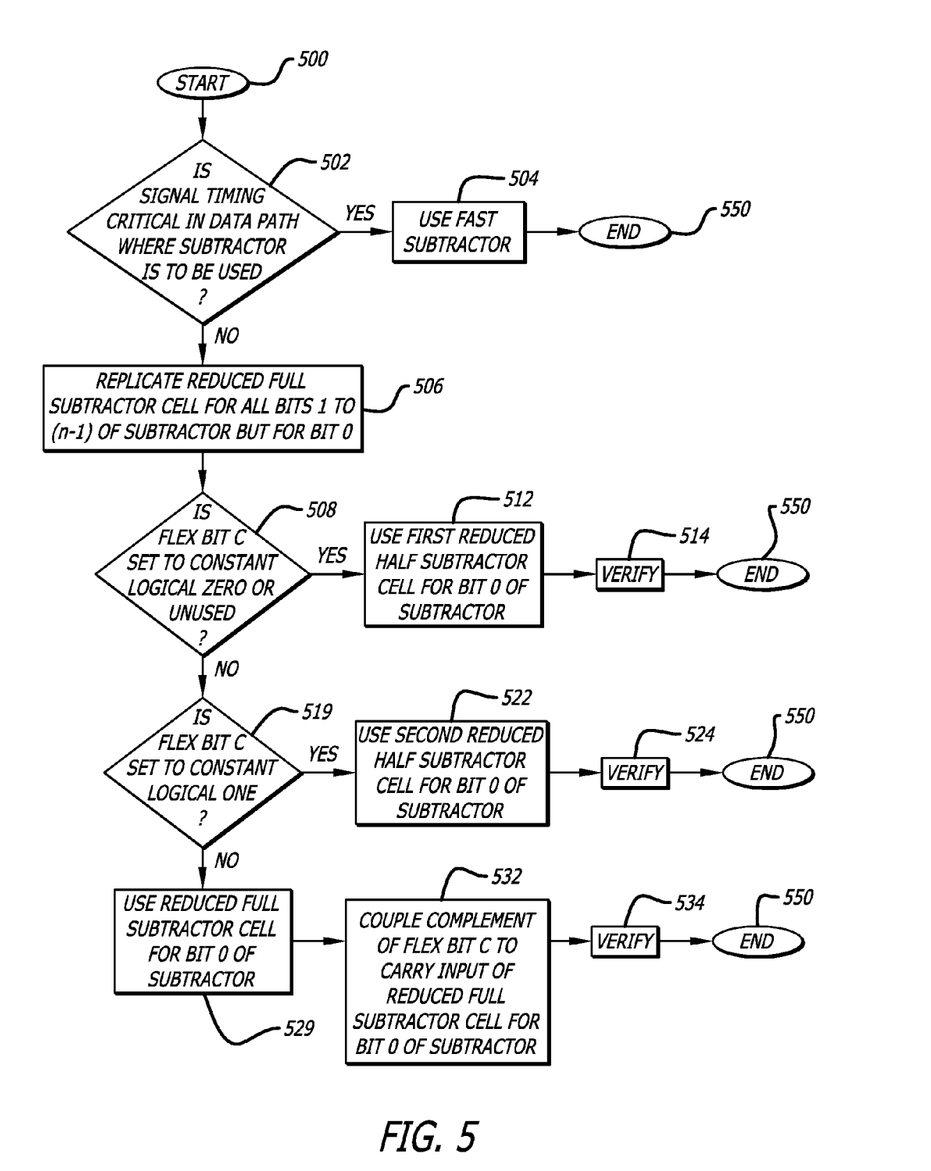
FIG. 5 is a flow chart of a logic synthesis method for a subtractor functional block including an area-efficient subtractor functional block if feasible.

Referring now to FIG. 5, a flow chart illustrating an exemplary method of the logical synthesis of a subtractor for functional blocks that include a subtraction arithmetic operation. More specifically, FIG. 5 illustrate methods of logic synthesis that may use an area-efficient subtractor provided that the additional delay may be tolerated in the data path over that of a conventional subtractor. As described below, the synthesis of the area-efficient subtractor is responsive to the flex bit C. The method starts at block 500 and jumps to a decision block 502.

At decision block 502, a determination is made if the timing of the input signals in the data path is critical where the functional block of a subtractor is to be implemented in the netlist. A delay computation unit uses the netlist of gates, the gate delays from the technology file of the standard cell library, input arrival times and the output required times to determine whether that block is in a critical timing path or not.

If yes, the signal timing is critical in the data path, the method jumps to block 504 where a conventional fast subtractor is utilized instead of the area efficient subtractor 200. In this case, inverters are used to invert every bit of vector B and are coupled into a fast adder to perform subtraction in two's complement form with a logic one value of $Carry_0$ in the least-significant-bit (LSB). One disadvantage to synthesizing this conventional fast subtractor is the area overhead associated with inverting every bit of vector B. Additionally, the fast adder prioritizes speed over area so that it may use a large footprint as well. In terms of area, the conventional fast subtractor is not optimal. With a conventional fast subtractor synthesized instead of the area efficient subtractor 200, the method then ends at block 550.

If the signal timing is not critical in the data path and the area efficient subtractor may be synthesized, the method jumps to block 506.

At block 506, the synthesis of the area efficient subtractor 200 begins by synthesizing the full subtractor cell 202. The reduced full subtractor cell 202 is then replicated as subtractor cells 202A-202M for bits 1 to n−1 of the area efficient subtractor, but may not for bit 0. The method may determine what type of subtractor bit cell is to be utilized for bit 0, sub0 201 of the area efficient subtractor 200 and jumps to block 508.

At decision block 508, a determination is made if the flex bit C is set to a constant of logical zero or alternatively unused. If the flex bit C is to be set to a constant of logical zero or unused, the method jumps to block 512. If the flex bit C is not to be set to a constant of logical zero or is otherwise used as a variable, the method jumps to block 519.

At block 512 of the subtractor synthesis method, the first half subtractor cell 201A is synthesized and instantiated as subtractor bit cell $Sub_0$ 201 in the area efficient subtractor 200. The method may then jump to block 514 where the timing in the data path with the area efficient subtractor 200 is verified by the delay computation unit. This completes the area efficient subtractor and the method may then end at block 550.

Otherwise at decision block 519, a determination is made if the flex bit C is set to a constant of logical one. If the flex bit C is to be set to a constant of logical one, the method jumps to block 522. If the flex bit C is not to be set to a constant of logical one, otherwise being a variable, the method jumps to block 529.

At block 522 of the subtractor synthesis method, the second half subtractor cell 201B is synthesized and instantiated as subtractor bit cell $Sub_0$ 201 in the area efficient subtractor 200. The method may then jump to block 524 where the timing in the data path with the area efficient subtractor 200 is verified by the delay computation unit. This completes the area efficient subtractor and the method may then end at block 550.

Otherwise at block 529, the reduced full subtractor cell 201C is synthesized and instantiated as subtractor bit cell $Sub_0$ 201 in the area efficient subtractor 200. The method then goes to block 532.

At block 532, the complement of the flex bit C (indicated by ~C in FIG. 4C) is coupled to the carry input bit, $carry_0$, of the full subtractor cell 201C by the synthesis tool.

Then the method may then jump to block 534 where the timing in the data path with the area efficient subtractor 200 is verified by the delay computation unit. This completes the area efficient subtractor and the method may then end at block 550.

The embodiments of the area efficient subtractor can be applied to any subtraction functional block in non-critical timing-paths, including a divider functional block.

Figure 6:
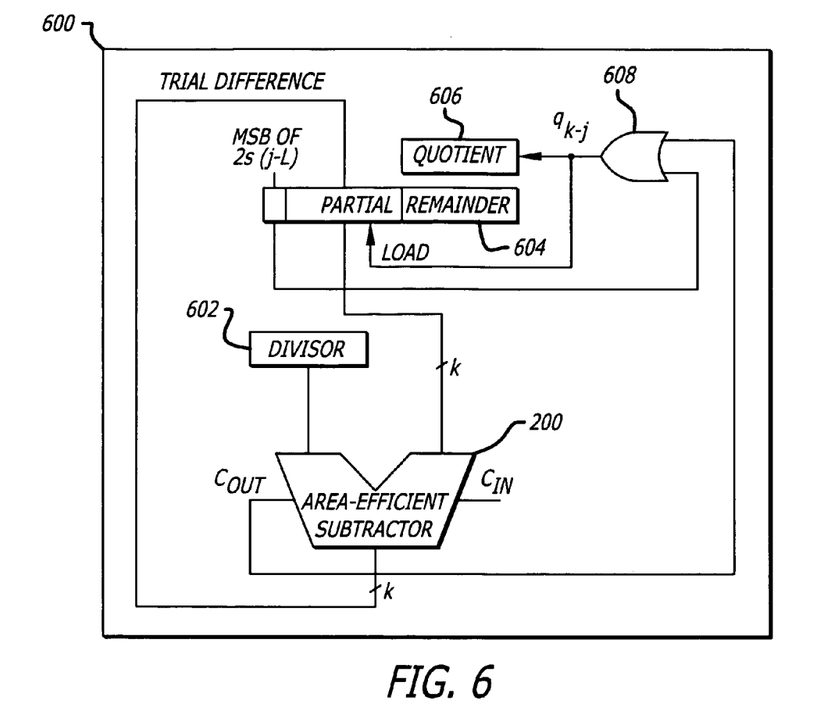
FIG. 6 is a logic diagram illustrating a combinational logic schematic of a divider functional block including an area-efficient subtractor.

Referring now to FIG. 6, a logic diagram illustrating a combinational logic schematic of a divider functional block 600 including an area-efficient subtractor 200 is illustrated.

Typically, the division equation looks like Z/D=Q+S/D where Z is the dividend, D is the divisor, Q is the quotient, and S is a remainder. Solving for Q we find the equation Q=Z/D−S/D. Further, multiplying each side by D the equation becomes DQ=Z−S. Adding S to each side, the equation further becomes DQ+S=Z. These various equations may be used to form different divisional algorithms for a digital divider.

In a digital divider, Z is a dividend vector with bits $z_{2k-1}$ $z_{2k-2} \ldots z_1 z_0$; D is the divisor vector with bits $d_{k-1} d_{k-2} \ldots d_1 d_0$; Q is the quotient vector with bits $q_{k-1} q_{k-2} \ldots q_1 q_0$; and S is the remainder vector with bits $s_{k-1} s_{k-2} \ldots S_1 S_0$.

Conceptionally, digital divisional can be performed sequentially in a long handed form. In this case, the divisor vector is initially subtracted from the dividend vector Z by a subtractor generating a first partial remainder. If the sign of the first partial reminder is negative, the MSB of the quotient vector Q is a logical zero and the dividend is used in the next subtraction. If the sign of the first partial remainder is positive, the MSB of the quotient vector Q is a logical one and the first partial remainder is used as the dividend in the next subtraction. The bits of the divisor vector D are shifted right and then subtracted from the dividend vector Z generating a second partial remainder.

Again the sign bit of the second partial remainder is checked. If the sign of the second partial reminder is negative, the bit MSB-1 of the quotient vector Q is a logical zero and the either the original dividend or first partial product, whichever was used in the most recent subtraction, is again used in the next subtraction. If the sign of the second partial remainder is positive, the bit MSB-1 of the quotient vector Q is a logical one and the second partial remainder is used as the next dividend in the next subtraction. The bits of the divisor vector D are shifted right and then subtracted from the dividend vector Z generating a second partial remainder. The process continues in a loop until the long hand division is completed through the bits.

The subtractor used to implement the long handed subtraction is an area-efficient subtractor in one embodiment of the invention. The area-efficient subtractor may be used in another type of digital divisional algorithm provided that the timing of the output result is relaxed.

As discussed previously, one of the divisional equations is Z=DQ+S. Rearranging the terms of this equation further we find that S=Z−DQ. In this way, a sequential division may be performed by keeping a partial remainder, initialized to $s^{(0)}=z$. Appropriately shifted terms $q_{k-j}d$, are successively subtracted from it. As each successive number subtracted from the partial remainder is shifted by one bit with respect to the preceding one, an alternative approach is to shift the partial remainder by one bit and then align its bit with those of the next term to be subtracted. This provides a well-known sequential division algorithm with left shifts as follows:

$$S^{(j)}=2s^{(j-1)}-q_{(k-j)}{}^{(d2^{-k})} \text{ with } s^{(0)}=z \text{ and } s^{(k)}=2^k s.$$

FIG. 6 illustrates a functional block diagram of logical blocks to perform the algorithm for the shift/subtract sequential restoring divider 600. In the functional block diagram of the divider 600, the subtraction is implemented by the area-efficient subtractor 200 with the full subtractor cell 202 of FIG. 3 and one of the subtractor cells of FIGS. 4A-4C.

The divider 600 further includes a divisor register 602, a partial remainder shift register 604, and a quotient register 606, and logical OR gate 608 coupled together as shown. The quotient register 606 is loaded bit by bit with each successive subtraction pass. The idea behind the logic is to shift the partial remainder stored in the shift register 604 appropriately and subtract the divisor from it to determine the bit value (logical 0 or 1) of a bit of the quotient vector Q. The OR gate 608 logically ORs the MSB of the partial reminder $2s^{(j-1)}$ with the carry out of the subtractor indicating a sign of the subtraction. If either is logical high, the bit $Q_{k-j}$ is a logical one and stored in the quotient register 606.

Figure 7:
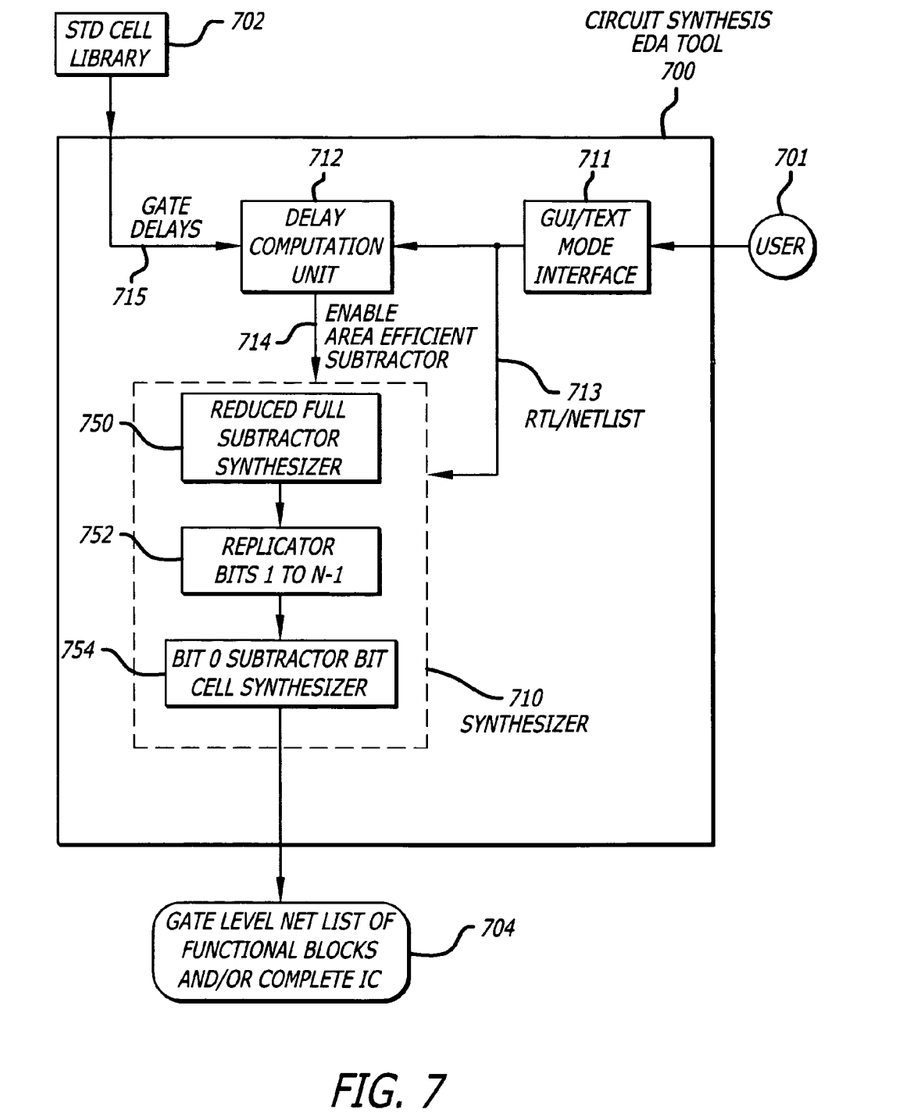
FIG. 7 is a block diagram of software modules of embodiments of the invention used to perform logic synthesis of an area efficient subtractor functional block.

Referring now to FIG. 7, an exemplary block diagram is illustrated of software modules of an electronic design automation (EDA) tool 700 used to perform logic synthesis of functional blocks that include the synthesis of an area-efficient subtractor for a subtraction or division functional block. The synthesis EDA tool 700 receives user inputs from a user 701 and a standard cell library 702 in order to generate a gate level netlist 704 of functional blocks and/or the complete integrated circuit. The EDA tool 700 includes a graphical user interface (GUI) or a text mode interface 711 for receiving inputs from the user 701 in the form of an RTL or Netlist of the subtractor and/or divider functional block as well as other functional blocks of the integrated circuit.

Generally, a netlist is a plurality of Boolean logical gates coupled together at nodes. The netlist of the area-efficient subtractor 200 is the plurality of Boolean logical gates described previously with respect to the subtractor bit cells 201, 202A-202M (e.g., reduced full subtractor cell 202 and subtractor cells 201A-201C) to provide a subtraction arithmetic function while conserving area.

The input (RTL/Netlist) description of the functional blocks/integrated circuit is coupled into a subtractor synthesizer 710 and a delay computation unit 712.

As discussed previously, the delay computation unit 712 computes the delay in the data path where a subtractor, divider, or other functional block having a subtractor is to be instantiated. Given the bit width of the subtractor, the delay computation unit 712 estimates the delay in the data path to determine if the area-efficient subtractor 200 may be used. If so, the delay computation unit 712 generates an enable signal 714 that is coupled into the synthesizer 710.

The synthesizer 710 includes a reduced full subtractor synthesizer module 750 to synthesize the reduced full subtractor cell 202. The synthesizer 710 further includes a replicator to replicate the reduced full subtractor 202 to instantiate bits 1 to n−1 of the area-efficient subtractor 200.

The synthesizer 710 further includes a bit zero subtractor synthesis module 750 to synthesize one of the subtractor cells 201A-201C as bit cell $\text{sub}_0$ 201 of the area-efficient subtractor 200. The bit zero subtractor synthesis module 750 is responsive to the flex bit C, whether a logical constant zero or one, or a variable.

The synthesizer 710 generates the gate level netlist 704 of functional blocks and/or the complete integrated circuit including the area-efficient subtractor 200.

The subtractor netlist generated using the architecture of the area efficient subtractor 200 is significantly smaller than a convention ripple subtractor. Since, a subtractor is extensively used in a divider; there can be a significant area savings in a divider functional block as well.

Figure 8:
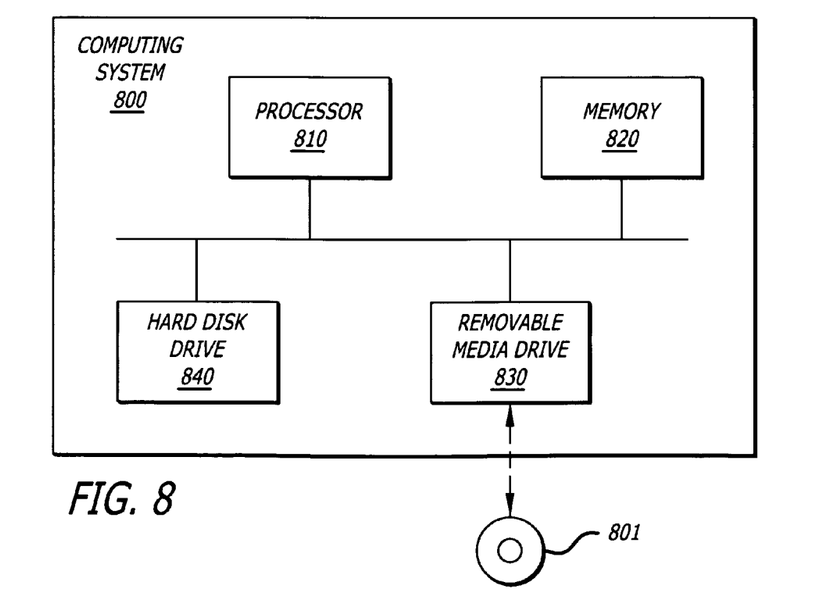
FIG. 8 illustrates an exemplary embodiment of a computing system usable with embodiments of the invention.

Referring now to FIG. 8, a computing system 800 is illustrated that may be used to perform some or all of the processes in accordance with a number of embodiments of the invention. In one embodiment of the invention, the computing system 800 includes a processor 810, a memory 820, a removable media drive 830, and a hard disk drive 840. In one embodiment, the processor 810 executes instructions residing on a machine-readable medium, such as the hard disk drive 840, a removable medium 801 (e.g., an optical medium (compact disk (CD), digital video disk (DVD), etc.), a magnetic medium (magnetic disk, a magnetic tape, etc.), or a combination of both. The instructions may be loaded from the machine-readable medium into the memory 820, which may include Random Access Memory (RAM), dynamic RAM (DRAM), etc. The processor 810 may retrieve the instructions from the memory 820 and execute the instructions to perform the operations described above.

Note that any or all of the components and the associated hardware illustrated in FIG. 8 may be used in various embodiments of the system 800. However, it should be appreciated that other configurations of the system 800 may include more or less devices than those shown in FIG. 8.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The embodiments of the invention also relate to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, the embodiments of the invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In VLSI design, if a subtractor is not in a critical path, users would want the synthesis tool to select a smaller architecture that might possibly be a slower architecture. The integrated circuit chip using the area-efficient subtractor disclosed herein conserves silicon area that can lower the costs of its manufacture.

When implemented in software, the elements of the embodiments of the invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a read only memory (ROM), a flash memory, an erasable programmable read only memory (EPROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. Instead, the embodiments of the invention should be construed according to the claims that follow below.

What is claimed is:

1. A method of designing an integrated circuit including a subtraction arithmetic function, the method comprising:
   generating, with a processor, a netlist of an area-efficient subtractor to subtract a first input vector from a second input vector, including
      generating a netlist of a reduced full subtractor cell, the netlist of the reduced full subtractor cell including an exclusive-NOR gate evaluating a shared Boolean expression for generation of a sum bit output and a carry bit output;
      replicating the netlist of the reduced full subtractor cell for all bits of the area-efficient subtractor but for the least significant bit; and
      selecting one of a plurality of differing netlists of different subtractor cells for the least significant bit of the area-efficient subtractor in response to a value of a flex bit;
      wherein each of the plurality of differing netlists of the different subtractor cells has a different combination of Boolean logical gates, and the value of the flex bit is further subtracted from the second input vector.

2. The method of claim 1, further comprising:
prior to generating a netlist of an area-efficient subtractor,
   determining if a data path of the first input vector and the second input vector is a critical timing path requiring minimized delay, and if not, then
   generating the netlist of the area-efficient subtractor.

3. The method of claim 2, further comprising:
if the data path of the first input vector or the second input vector is a critical timing path requiring minimized delay, then
   skipping the generating of the netlist of the area-efficient subtractor,
   and
   generating a netlist of a conventional fast subtractor.

4. The method of claim 1, wherein
the netlist of the area-efficient subtractor is a plurality of Boolean logical gates coupled together at nodes to provide the subtraction arithmetic function while conserving area.

5. The method of claim 4, wherein
the exclusive-NOR gate of each reduced full subtractor cell has a first input coupled to a first vector input bit and a second input coupled to a second vector input bit, and
each reduced full subtractor cell further includes the Boolean logical gates of
   an exclusive-OR gate having a first input coupled to an output of the exclusive-NOR gate and a second input coupled to a carry input bit, the exclusive-OR gate having an output to generate the sum output bit from the exclusive-OR gate;
   a first AND gate having a first input coupled to the output of the exclusive-NOR gate and a second input coupled to the carry input bit;
   an inverter gate having an input coupled to the first vector input bit to generate a complemented first vector input bit;
   a second AND gate having a first input coupled to the second vector input bit and a second input coupled to an output of the inverter gate to receive the complemented first vector input bit; and
   an OR gate having a first input coupled to an output of the first AND gate and a second input coupled to an output of the second AND gate, the OR gate having an output to generate the carry output bit from the OR gate.

6. The method of claim 4, wherein
the value of the flex bit is a variable binary value alternating between a logical zero and a logical one, and
the selected netlist for the least significant bit (LSB) of the area-efficient subtractor includes the Boolean logical gates of
- an exclusive-NOR gate having a first input coupled to an LSB of the first vector input and a second input coupled to an LSB of the second vector input,
- an exclusive-OR gate having a first input coupled to an output of the exclusive-NOR gate and a second input coupled to a complement of the flex bit, the exclusive-OR gate having an output to generate an LSB sum output bit from the exclusive-OR gate,
- a first AND gate having a first input coupled to the output of the exclusive-NOR gate and a second input coupled to the complement of the flex bit,
- an inverter gate having an input coupled to the LSB of the first vector input to generate a complemented LSB of the first vector input,
- a second AND gate having a first input coupled to the LSB of the second vector input and a second input coupled to an output of the inverter gate to receive the complemented LSB of the first vector input, and
- an OR gate having a first input coupled to an output of the first AND gate and a second input coupled to an output of the second AND gate, the OR gate having an output to generate a first carry output bit from the OR gate.

7. The method of claim 4, wherein
the value of the flex bit is a constant logical zero, and
the selected netlist for the least significant bit (LSB) of the area-efficient subtractor includes the Boolean logical gates of
- an exclusive-OR gate having a first input coupled to an LSB of the first vector input and a second input coupled to an LSB of the second vector input,
- an inverter gate having an input coupled to the LSB of the first vector input to generate a complemented LSB of the first vector input, and
- an OR gate having a first input coupled to the LSB of the second vector input and a second input coupled to an output of the inverter gate, the OR gate having an output to generate a first carry output bit from the OR gate.

8. The method of claim 4, wherein
the value of the flex bit is a constant logical one, and
the selected netlist for the least significant bit (LSB) of the area-efficient subtractor includes the Boolean logical gates of
- an exclusive-NOR gate having a first input coupled to an LSB of the first vector input and a second input coupled to an LSB of the second vector input,
- an inverter gate having an input coupled to the LSB of the first vector input to generate a complemented LSB of the first vector input, and
- an AND gate having a first input coupled to the LSB of the second vector input and a second input coupled to an output of the inverter gate, the AND gate having an output to generate a first carry output bit from the AND gate.

9. The method of claim 1, wherein
the second vector is a minuend,
the first vector is a first subtrahend, and
the flex bit is a second subtrahend.

10. A system for designing an integrated circuit including a subtraction arithmetic function, the system comprising:
a processor configured to generate a netlist of an area-efficient subtractor to subtract a first input vector from a second input vector, and thereby the processor is configured to
- generate a netlist of a reduced full subtractor cell, the netlist of the reduced full subtractor cell including an exclusive-NOR gate evaluating a shared Boolean expression for generation of a sum bit output and a carry bit output;
- replicate the netlist of the reduced full subtractor cell for all bits of the area-efficient subtractor but for the least significant bit; and
- select one of a plurality of differing netlists of different subtractor cells for the least significant bit of the area-efficient subtractor in response to a value of a flex bit;
wherein each of the plurality of differing netlists of the different subtractor cells has a different combination of Boolean logical gates, and the value of the flex bit is further subtracted from the second input vector.

11. The system of claim 10, wherein the processor is further configured to:
prior to generating a netlist of an area-efficient subtractor, determine if a data path of the first input vector and the second input vector is a critical timing path requiring minimized delay, and if not, then
generate the netlist of the area-efficient subtractor.

12. The system of claim 11, wherein the processor is further configured to:
if the data path of the first input vector or the second input vector is a critical timing path requiring minimized delay, then
skip the generating of the netlist of the area-efficient subtractor,
and
generate a netlist of a conventional fast subtractor.

13. The system of claim 10, wherein
the netlist of the area-efficient subtractor is a plurality of Boolean logical gates coupled together at nodes to provide the subtraction arithmetic function while conserving area.

14. The system of claim 13, wherein
the exclusive-NOR gate of each reduced full subtractor cell has a first input coupled to a first vector input bit and a second input coupled to a second vector input bit, and
each reduced full subtractor cell further includes the Boolean logical gates of
- an exclusive-OR gate having a first input coupled to an output of the exclusive-NOR gate and a second input coupled to a carry input bit, the exclusive-OR gate having an output to generate the sum output bit from the exclusive-OR gate;
- a first AND gate having a first input coupled to the output of the exclusive-NOR gate and a second input coupled to the carry input bit;
- an inverter gate having an input coupled to the first vector input bit to generate a complemented first vector input bit;
- a second AND gate having a first input coupled to the second vector input bit and a second input coupled to an output of the inverter gate to receive the complemented first vector input bit; and
- an OR gate having a first input coupled to an output of the first AND gate and a second input coupled to an output of the second AND gate, the OR gate having an output to generate the carry output bit from the OR gate.

15. The system of claim 13, wherein
the value of the flex bit is a variable binary value alternating between a logical zero and a logical one, and
the selected netlist for the least significant bit (LSB) of the area-efficient subtractor includes the Boolean logical gates of
an exclusive-NOR gate having a first input coupled to an LSB of the first vector input and a second input coupled to an LSB of the second vector input,
an exclusive-OR gate having a first input coupled to an output of the exclusive-NOR gate and a second input coupled to a complement of the flex bit, the exclusive-OR gate having an output to generate an LSB sum output bit from the exclusive-OR gate,
a first AND gate having a first input coupled to the output of the exclusive-NOR gate and a second input coupled to the complement of the flex bit,
an inverter gate having an input coupled to the LSB of the first vector input to generate a complemented LSB of the first vector input,
a second AND gate having a first input coupled to the LSB of the second vector input and a second input coupled to an output of the inverter gate to receive the complemented LSB of the first vector input, and
an OR gate having a first input coupled to an output of the first AND gate and a second input coupled to an output of the second AND gate, the OR gate having an output to generate a first carry output bit from the OR gate.

16. The system of claim 13, wherein
the value of the flex bit is a constant logical zero, and
the selected netlist for the least significant bit (LSB) of the area-efficient subtractor includes the Boolean logical gates of
an exclusive-OR gate having a first input coupled to an LSB of the first vector input and a second input coupled to an LSB of the second vector input,
an inverter gate having an input coupled to the LSB of the first vector input to generate a complemented LSB of the first vector input, and
an OR gate having a first input coupled to the LSB of the second vector input and a second input coupled to an output of the inverter gate, the OR gate having an output to generate a first carry output bit from the OR gate.

17. The system of claim 13, wherein
the value of the flex bit is a constant logical one, and
the selected netlist for the least significant bit (LSB) of the area-efficient subtractor includes the Boolean logical gates of
an exclusive-NOR gate having a first input coupled to an LSB of the first vector input and a second input coupled to an LSB of the second vector input,
an inverter gate having an input coupled to the LSB of the first vector input to generate a complemented LSB of the first vector input, and
an AND gate having a first input coupled to the LSB of the second vector input and a second input coupled to an output of the inverter gate, the AND gate having an output to generate a first carry output bit from the AND gate.

18. The system of claim 10, wherein
the second vector is a minuend,
the first vector is a first subtrahend, and
the flex bit is a second subtrahend.

19. A machine-readable product to design an integrated circuit including a subtraction arithmetic function, the machine-readable product comprising:
a non-transitory machine-readable medium having stored therein
machine-readable program code to generate a netlist of an area-efficient subtractor to subtract a first input vector from a second input vector, including
machine-readable program code to generate a netlist of a reduced full subtractor cell, the netlist of the reduced full subtractor cell including an exclusive-NOR gate evaluating a shared Boolean expression for generation of a sum bit output and a carry bit output;
machine-readable program code to replicate the netlist of the reduced full subtractor cell for all bits of the area-efficient subtractor but for the least significant bit; and
machine-readable program code to select one of a plurality of differing netlists of different subtractor cells for the least significant bit of the area-efficient subtractor in response to a value of a flex bit;
wherein each of the plurality of differing netlists of the different subtractor cells has a different combination of Boolean logical gates, and the value of the flex bit is further subtracted from the second input vector.

20. The machine-readable product of claim 19, wherein prior to generating the netlist of an area-efficient subtractor the non-transitory machine-readable medium has stored therein,
machine-readable program code to determine if a data path of the first input vector and the second input vector is a critical timing path requiring minimized delay, and if not, then
machine-readable program code to generate the netlist of the area-efficient subtractor.

21. The machine-readable product to of claim 20, wherein prior to generating the netlist of an area-efficient subtractor the non-transitory machine-readable medium has stored therein,
if the data path of the first input vector or the second input vector is a critical timing path requiring minimized delay, then
machine-readable program code to skip the generating of the netlist of the area-efficient subtractor, and
machine-readable program code to generate a netlist of a conventional fast subtractor.

22. The machine-readable product of claim 19, wherein
the netlist of the area-efficient subtractor is a plurality of Boolean logical gates coupled together at nodes to provide the subtraction arithmetic function while conserving area.

23. The machine-readable product of claim 22, wherein
the exclusive-NOR gate of each reduced full subtractor cell has a first input coupled to a first vector input bit and a second input coupled to a second vector input bit, and
each reduced full subtractor cell further includes the Boolean logical gates of
an exclusive-OR gate having a first input coupled to an output of the exclusive-NOR gate and a second input coupled to a carry input bit, the exclusive-OR gate having an output to generate the sum output bit from the exclusive-OR gate;

a first AND gate having a first input coupled to the output of the exclusive-NOR gate and a second input coupled to the carry input bit;

an inverter gate having an input coupled to the first vector input bit to generate a complemented first vector input bit;

a second AND gate having a first input coupled to the second vector input bit and a second input coupled to an output of the inverter gate to receive the complemented first vector input bit; and an OR gate having a first input coupled to an output of the first AND gate and a second input coupled to an output of the second AND gate, the OR gate having an output to generate the carry output bit from the OR gate.

24. The machine-readable product of claim 22, wherein the value of the flex bit is a variable binary value alternating between a logical zero and a logical one, and the selected netlist for the least significant bit (LSB) of the area-efficient subtractor includes the Boolean logical gates of an exclusive-NOR gate having a first input coupled to an LSB of the first vector input and a second input coupled to an LSB of the second vector input, an exclusive-OR gate having a first input coupled to an output of the exclusive-NOR gate and a second input coupled to a complement of the flex bit, the exclusive-OR gate having an output to generate an LSB sum output bit from the exclusive-OR gate, a first AND gate having a first input coupled to the output of the exclusive-NOR gate and a second input coupled to the complement of the flex bit, an inverter gate having an input coupled to the LSB of the first vector input to generate a complemented LSB of the first vector input, a second AND gate having a first input coupled to the LSB of the second vector input and a second input coupled to an output of the inverter gate to receive the complemented LSB of the first vector input, and an OR gate having a first input coupled to an output of the first AND gate and a second input coupled to an output of the second AND gate, the OR gate having an output to generate a first carry output bit from the OR gate.

25. The machine-readable product of claim 22, wherein the value of the flex bit is a constant logical zero, and the selected netlist for the least significant bit (LSB) of the area-efficient subtractor includes the Boolean logical gates of an exclusive-OR gate having a first input coupled to an LSB of the first vector input and a second input coupled to an LSB of the second vector input, an inverter gate having an input coupled to the LSB of the first vector input to generate a complemented LSB of the first vector input, and an OR gate having a first input coupled to the LSB of the second vector input and a second input coupled to an output of the inverter gate, the OR gate having an output to generate a first carry output bit from the OR gate.

26. The machine-readable product of claim 22, wherein the value of the flex bit is a constant logical one, and the selected netlist for the least significant bit (LSB) of the area-efficient subtractor includes the Boolean logical gates of an exclusive-NOR gate having a first input coupled to an LSB of the first vector input and a second input coupled to an LSB of the second vector input, an inverter gate having an input coupled to the LSB of the first vector input to generate a complemented LSB of the first vector input, and an AND gate having a first input coupled to the LSB of the second vector input and a second input coupled to an output of the inverter gate, the AND gate having an output to generate a first carry output bit from the AND gate.

27. The machine-readable product of claim 19, wherein the second vector is a minuend, the first vector is a first subtrahend, and the flex bit is a second subtrahend.

\* \* \* \* \*